United States Patent [19]

Watanabe

[11] Patent Number: 4,609,271
[45] Date of Patent: Sep. 2, 1986

[54] SMALL SIZE CAMERA

[75] Inventor: Yoshiaki Watanabe, Kanagawa, Japan

[73] Assignee: Canon Kabushiki Kaisha, Tokyo, Japan

[21] Appl. No.: 698,755

[22] Filed: Feb. 7, 1985

Related U.S. Application Data

[63] Continuation of Ser. No. 371,805, Apr. 26, 1982, abandoned.

[30] Foreign Application Priority Data

May 7, 1981 [JP] Japan .................................. 56-68523

[51] Int. Cl.$^4$ ............................................. G03B 17/02
[52] U.S. Cl. .................................. 354/202; 354/275; 354/288
[58] Field of Search ............... 354/202, 270, 275, 288, 354/354, 195.1, 195.12; 242/71.2

[56] References Cited

U.S. PATENT DOCUMENTS

| | | | |
|---|---|---|---|
| 1,686,944 | 10/1928 | Weidert | 354/275 |
| 3,227,058 | 1/1966 | Hochreiter | 354/275 |
| 3,317,154 | 5/1967 | Leslie | 242/71.2 |
| 3,437,028 | 4/1969 | Berlings | 242/71.2 |
| 3,581,641 | 6/1971 | Nerwin | 354/275 |
| 3,592,404 | 7/1971 | Nerwin | 242/71.2 |
| 4,131,353 | 12/1978 | Engelsmann | 354/197 |
| 4,148,574 | 4/1979 | Johnson | 354/195.1 |
| 4,277,158 | 7/1981 | Zawodny | 354/197 |
| 4,295,714 | 10/1981 | Payne | 354/270 |

Primary Examiner—A. A. Mathews
Attorney, Agent, or Firm—Toren, McGeady, Stanger, Goldberg & Kiel

[57] ABSTRACT

Disclosed is a method for reducing the dimensions of cameras by arranging the film supplying chamber and the film winding chamber on both sides of the aperture, and by projecting at least one of the external walls defining these chambers into the space behind the photographing lens to avoid interfering with the image forming optical path.

2 Claims, 12 Drawing Figures

F I G. 2
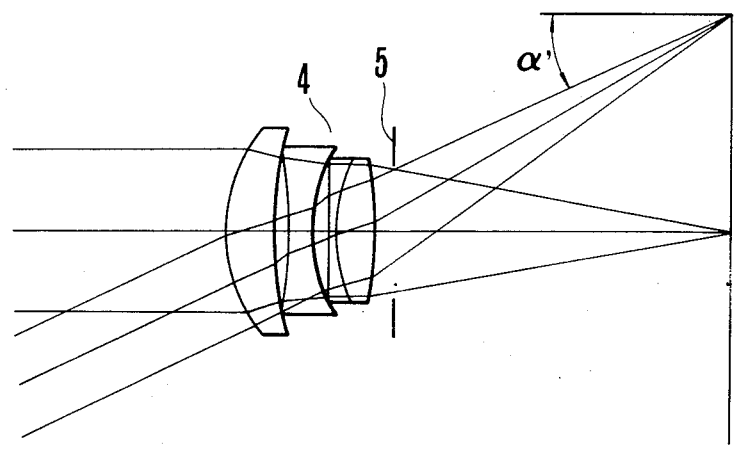

SMALL SIZE CAMERA

This is a continuation of application Ser. No. 371,805, filed Apr. 26, 1982, now abandoned.

BACKGROUND OF THE INVENTION

1. Field of the Invention

The present invention relates to a camera having made more possible by efficiently arranging the film supply and take up chambers.

2. Description of the Prior Art

Generally, a camera body is constructed as is shown in FIG. 1. Namely, the film supplying chamber 2 is located on one side of the aperture part and the film winding chamber 3 are is located on the other side 1. In a 35 mm camera, it is believed that the width of a camera can not be smaller than the size corresponding to the simple sum of the size of the aperture part 1, the film in this type of camera supplying chamber 2 and the film winding chamber 3 corresponding to the size of the film. Namely, even if the size of each part can be made smaller, it is impossible to alter their arrangement, namely the principal arrangement which secures a space for the optical path to the film up plane at the aperture part 1 or the film loading space connected to the film feeding.

Consequently in order to make the conventional camera compact, a lens of the behind aperture type in a simple construction as is shown in FIG. 2 is adopted, whereby the aperture and so on is not included in the photographing lens 4, instead of the Tessor or Triplet type of lens shown in FIG. 1. A behind the aperture lens 4 can be placed much closer to the aperture than the type shown in FIG. 1, whereby the thickness of the camera can be reduced accordingly.

Further, the total length of the lens is reduced. FIG. 3 shows an example, which comprises a front group consisting of the convergent lens 4a and a rear group consisting of the divergent lens 4b arranged a short distance from the front lens so as to have telephoto characteristics with a reduced total length. The ratio of the total length L of the lens to the focal length f is smaller than 1.1, which contributes to the reduction of the thickness of the camera.

On the other hand arranging the lens pupil closer to the aperture part of the camera enlarges the circumferential angle $\alpha$ between the light path from the lens and is perpendicular to the film plane at the aperture part ($\alpha < \alpha' < \alpha''$ in FIGS. 1 to 3), which means that the space surrounding the image forming optical path behind the lens becomes large with a large angle toward the front side of the camera.

SUMMARY OF THE INVENTION

It is an object of the present invention to reduce the width of the camera body by projecting a part of the external wall of the film supply and winding chamber into the space surrounding the image forming optical path behind the photographing lens in order so overcome the above-mentioned shortcomings.

It is another object of the present invention to obtain an evenness of the film and a smooth film supply.

Further other objects of the present invention will be clear from the explanations to be made below in accordance with the embodiments.

BRIEF DESCRIPTION OF THE DRAWINGS

FIG. 2 shows the lens system of a behind aperture type.

DESCRIPTION OF THE PREFERRED EMBODIMENTS

An embodiment of the present invention will be explained with reference to the drawings hereof.

Figure 1:
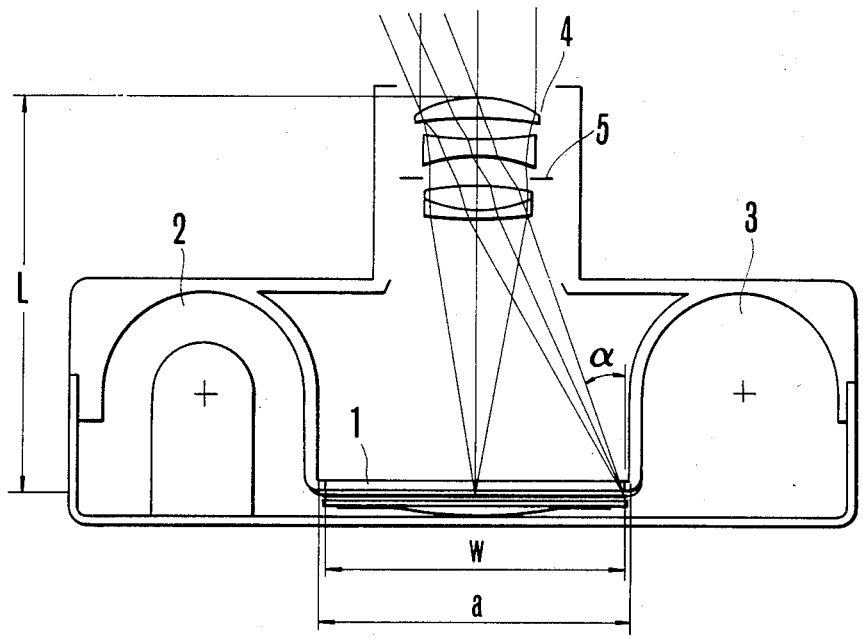
FIG. 1 shows the camera body of the conventional lens shutter type.
Figure 3:
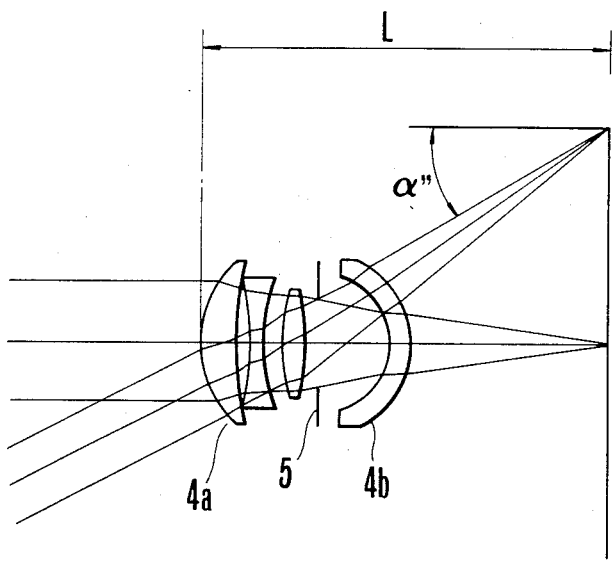
FIG. 3 shows a lens system with the characteristics of the telephoto type.
Figure 4:
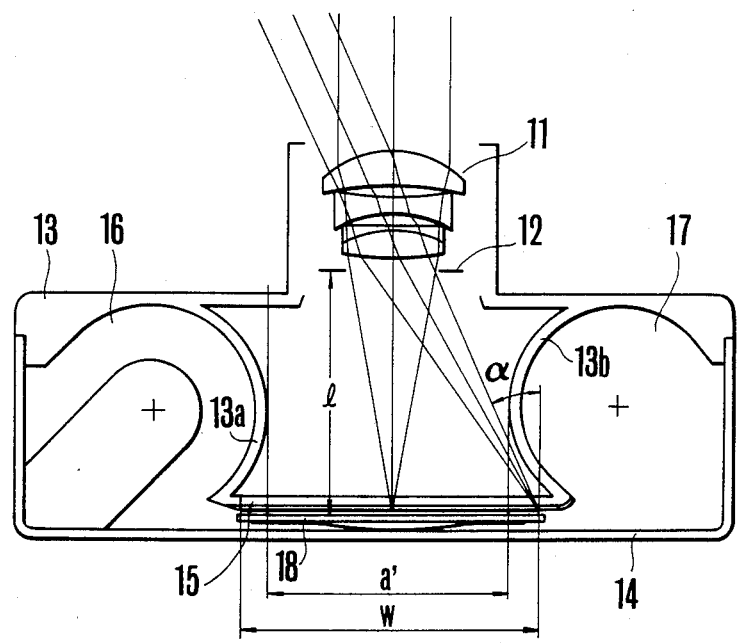
FIG. 4 shows an embodiment of the camera body of the present invention.

FIG. 4 shows a camera with a behind the aperture type of lens. In the drawing, 11 is the photographing lens, 12 the aperture and shutter, 13 the camera body in front of which the photographing lens 11 and the aperture and shutter 12 are arranged. The aperture part 15 is arranged behind the camera body 13 so as to form one unit with the camera body 13, 16 and 17 the film supply chamber and the film winding chambers arranged on both side of the camera body 13, with the aperture part 15 at the center. 18 is the film press plate arranged on the inside surface of the back cover 14. The cylindrical wall parts 13a and 13b, which separate the film supplying chamber 16 and the film winding chamber 17 from the space behind the photographing lens 11 respectively project into the space behind the photographing lens without interfering with the image forming optical path. In this manner the distance a', between the wall of the film supplying chamber 16 and that of the film winding chamber 17, is largely reduced as compared with the conventional distance, a, between the wall of the film supplying chamber 2 and the wall of the film winding chamber 3 shown in FIG. 1. Until now, the wall distance a was larger than the width W of the aperture part, while in accordance with present invention a' is smaller than W allowing a reduction in the width of the camera body. Further, when the lens is changed from that of the behind aperture type to that of the telephoto type, see FIG. 5, with the convergent lens 11a as front lens and the divergent lens 11b as rear lens, the distance l between the position of the aperture 12 and the film plane at the aperture part can be reduced in such a manner that the wall distance a' can be further reduced down to a'', therefore the width of the camera body 13 can be further reduced. For example, the width of the ordinary lens shutter 35 mm camera with a photographing lens f=38 m/m (F: 2.8) shown in FIG. 5 can be 15 or more millimeters smaller than that shown in FIG. 1.

Figure 5:
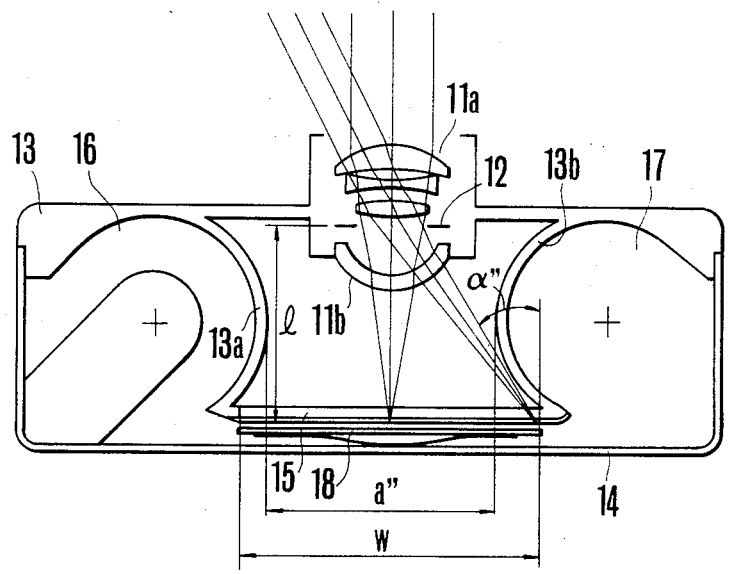
FIG. 5 shows a camera body in which a lens system of the behind aperture type shown in FIG. 4 is replaced with a lens system of the telephoto type.

As is shown in FIGS. 4 and 5 the film supplying chamber and the film winding chamber 17 openings slant backward so that the formability of the camera body and the film loading operation are improved.

Figure 6:
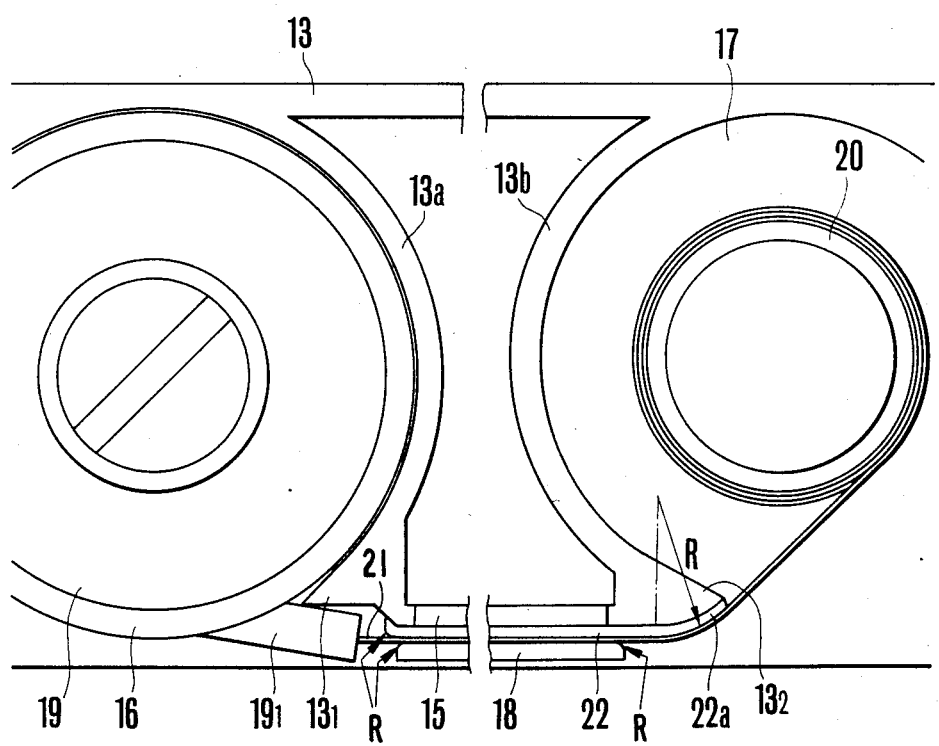
FIG. 6 shows the enlargement of the film supply and winding parts shown in FIG. 4 and FIG. 5.

Further, as shown in FIG. 6, the film magazine 19 approaches the aperture part 15 due to the reduction of the width of the camera body 13 and that the film 21 to be wound from the aperture part 15 on the spool 20 curves abruptly, the following means are adopted for the feeding and the guiding of the film. Namely, a chin pad 13, is provided at the edge of the circumferential wall of the aperture at the film supply chamber 16 in such a manner that the film exit 19, of the film magazine 19 is engaged with the chin pad 13, so that the film can be fed between the rail 22 and the film press plate 18 above and beneath the aperture 15 smoothly. At the same time a guide projection $13_2$ having a projection 22a of the curved rail 22 is provided at the edge at the film winding chamber 17 so as to obtain stability of the image forming plane and to reduce the winding strength of the spool 20.

In case of the above construction, however, the film magazine 19 is to be rotated with the pulling out the film, therefore, the film exit $19_1$ is engaged with the chin pad $13_1$ so that it is stabilized against the pull out force in such a manner that the film is smoothly fed behind the aperture part 15.

Further, the film 21 to be wound from the aperture part 15 on the spool 20 is smoothly led to the spool 20 by the projection 22a of the rail beside the projection $13_2$ making a curved guide plane toward the film winding chamber 17 with radius R as is shown in FIG. 6. The superior transmission of the pull out force and the evenness of the film behind the aperture part can thus be obtained.

Hereby, the rail 22 is constructed so as to be lengthened the film feeding direction parallel to the opening behind the aperture part 15, and a material with small surface frictional coefficient is selected in order to obtain the smooth feeding and guide of the film.

Figure 7A:
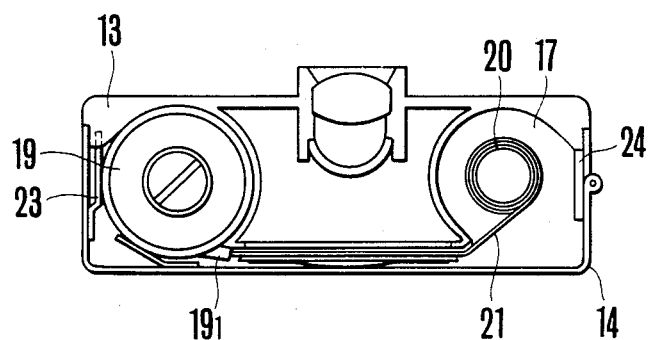
FIG. 7(a) shows the camera body in which the mount for the back cover and the stabilization of the film magazine are added to the camera body in FIG. 5.
Figure 7B:
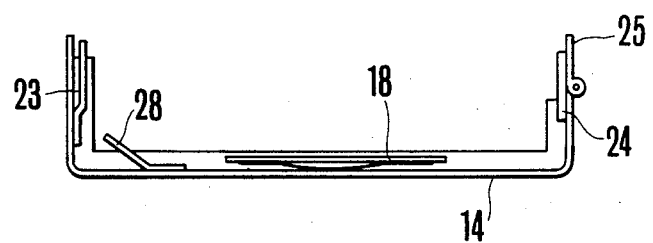
FIG. 7(b) shows in detail the back cover in FIG. 7(a).
Figure 8A:
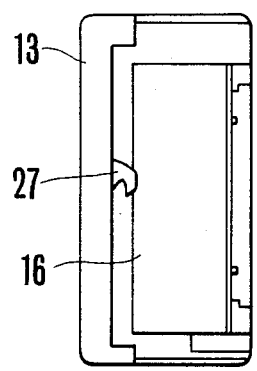
FIG. 8(a) shows the left side of the camera body in FIG. 7(a).
Figure 8B:
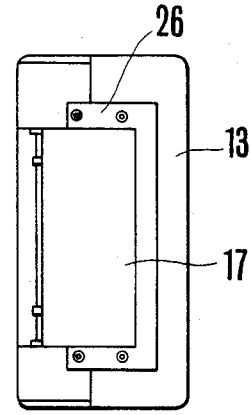
FIG. 8(b) shows the right side of the camera body in FIG. 7(a).
Figure 8C:
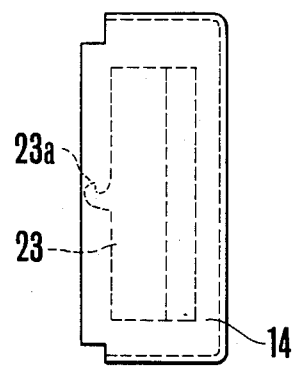
FIG. 8(c) shows the left side of the back cover in FIG. 7(b).
Figure 8D:
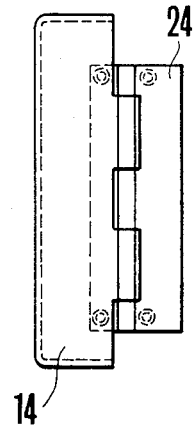
FIG. 8(d) shows the right side of the back cover in FIG. 7(b).

FIGS. 7(a), (b) and FIGS. 8(a), (b), (c) and (d) show the addition of the mount for the back cover which stabilizes the film magazine to the camera body shown in FIG. 5. As is shown in FIGS. 7(a) and (b), the back cover 14 is provided with the limit plate 23 serving at the same time as the lock claw and the light shading plate 24 for the hinge part. As shown in FIGS. 7(b) 8(a) and (d), the light shading plate 24 makes one body with the hinge part 25. The mount 26 has four screws so as to open and close the cover, while the limit plate 23 with lock claw 23a is secured on the side surface of the back cover 14 so as to cover the film feeding chamber 16 as is shown in FIGS. 8(a) and (c) and locked with the lock lever 27.

Further, on the internal surface of the back cover 14 a film magazine press 28 is provided so as to support the film magazine 19, in the film supply chamber 16, in a more stabilized way, as is shown in FIG. 7(a).

Although in the above-mentioned embodiments, both the cylindrical wall of the film supplying chamber and that of the film winding chamber project into the space behind the lens, the present invention is not limited to this arrangement, it goes without saying that only one of the chambers can project into the space behind the lens. Further, because the projecting walls of both of the above chambers are normaly rounded, the most desired ratio of W to l is larger than 1.1, due to the circumferential light angle α, in order to reduce the width without increasing the thickness of the camera, where W is the width of the aperture part and l is the distance between the position of the aperture and the film plane at the aperture part in case of the ordinary 35 mm camera.

Further in case of a compact camera in accordance with the present invention, it often happens that a larger pull out strength is needed or that the evenness of the film becomes inferior when the film is fed from the film magazine to the aperture part and then wound on the spool through the aperture part. In accordance with the present invention the above-mentioned problem is solved in such a manner that the film magazine is stabilized with the chin pad provided near the film supplying chamber and the film is smoothly led from the aperture part to the spool with the curved rail.

As explained, in case of the super compact camera in accordance with the present invention, the width can be reduced in accordance with the recent tendency towards compact cameras.

What is claimed is:

1. A small size camera using 35 mm film comprising:
   a camera body;
   a photographing lens arranged in the front part of said camera body and having a divergent lens so as to reduce the total length of the lens;
   an aperture part formed at the rear part of said camera body as an opening for a photo-taking;
   said camera body having a space formed behind the photographing lens; said space comprising an image forming optical path zone and a zone excluding the image forming optical path zone, said latter zone increasing forward the front portion of the camera body by virtue of the divergent lens;
   a film supplying chamber formed at one end of the camera body, said film supplying chamber having an opening facing in a slantedly backward external direction;
   a film winding chamber formed at the other end of the camera body, said film winding chamber having an opening facing in a slantedly backward external direction;
   wall parts dividing the space into the film supplying chamber and the film winding chamber, wherein at least one of said wall parts largely projects into the zone including the image forming optical path zone so that a lateral width of the total camera is made shorter;
   wherein a dimensional condition of a'<W is satisfied, in which a' is the shortest distance between the wall part of the film supplying chamber and that of the film winding chamber, while W is the width of the aperture part and wherein a film magazine engaging part is provided at the edge between the wall part of the film supplying chamber and the aperture part, said film magazine engaging part engaging with a film exit means of the loaded film magazine so as to stabilize the loaded film magazine; and
   further comprising a film guide rail arranged above the aperture part, said rail providing a curved portion at the wall part of the film winding chamber so as to stabilize the film feeding.

2. A small size camera comprising:
   (a) a camera body;

(b) a photographing lens arranged in the front part of said camera body;
(c) an aperture part formed at the rear part of said camera body as an opening for a photo-taking;
(d) said camera body having a space formed behind the photographing lens;
(e) a film supplying chamber formed at one end of the camera body;
(f) a film winding chamber formed at the other end of the camera body, said film winding chamber having an opening facing in a slantedly backward external direction;
(g) wall parts dividing the space into the film supplying chamber and the film winding chamber, wherein at least one of said wall parts projects into the space so that a lateral width of the total camera is made shorter; and
(h) a film guide part providing a curved portion at the wall part of the film winding chamber so as to stabilize the film feeding.

* * * * *